May 18, 1943.  J. E. DUGGAN  2,319,726

SUCTION CUP STRUCTURE

Original Filed July 29, 1940

INVENTOR.
JAMES EDWARD DUGGAN
BY
ATTORNEYS

Patented May 18, 1943

2,319,726

UNITED STATES PATENT OFFICE 2,319,726

SUCTION CUP STRUCTURE

James Edward Duggan, Detroit, Mich.

Original application July 29, 1940, Serial No. 348,264, now Patent No. 2,286,473, dated June 16, 1942. Divided and this application March 23, 1942, Serial No. 435,889

4 Claims. (Cl. 248—206)

This invention relates generally to suction cup structures and constitutes a division of my application filed July 29, 1940, bearing Serial No. 348,264, now Patent No. 2,286,473 dated June 16, 1942.

One of the essential objects of the invention is to provide a suction cup structure that may be easily and quickly applied to and removed from a surface without marring the same.

Another object is to provide a suction cup structure having a valve means for controlling the suction or vacuum between said cup structure and the surface engaged thereby.

Another object is to provide a suction cup structure wherein the valve element of the valve means mentioned has a knurled stem by which said valve element and the cup structure as a whole may be manipulated.

Another object is to provide a suction cup structure that is simple in construction, economical to manufacture and efficient in operation.

Other objects, advantages and novel details of construction of this invention will be made more apparent as this description proceeds, especially when considered in connection with the accompanying drawing, wherein.

Figure 1:
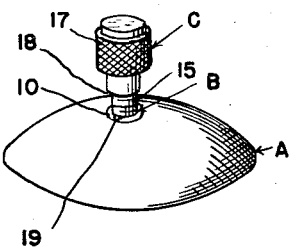
Figure 1 is a perspective view of a suction cup structure embodying my invention.
Figure 2:
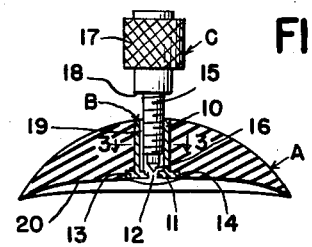
Figure 2 is a vertical sectional view through the suction cup structure illustrated in Figure 1.
Figure 3:
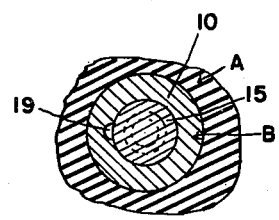
Figure 3 is a sectional view taken substantially on the line 3—3 of Figure 2.
Figure 4:
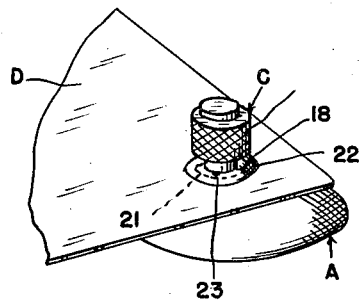
Figure 4 is a fragmentary perspective view of a mask applied to the suction cup structure.

Referring now to the drawing, A is the body, B is a centrally located socket member, and C is an adjusting screw of a suction cup structure embodying my invention.

As shown, the body A is formed of resilient material such as rubber or rubber composition and is substantially concavo-convex in configuration.

The socket member B extends through the body A from bottom to top thereof and preferably comprises an interiorly threaded tube 10 provided at its lower end with a base 11 having an opening 12 at the center thereof and having a laterally projecting annular portion 13 anchored within a suitable recess 14 in the lower face of said body. The upper open end of the tube 10 is substantially flush with the upper surface of the body.

The adjusting screw C has an exteriorly threaded shank 15 engaging the interiorly threaded tube 10 and has a pointed lower end 16 engageable with the edges of the opening 12 in the base 11. Said screw C also has a knurled head 17 by which it may be manipulated and is provided between said head 17 and shank 15 with an annular shoulder 18.

Thus, from the foregoing, it will be apparent that the pointed end 16 of the screw C serves as a valve element and that the base 11 of the socket member B serves as a seat for said valve element. To permit the flow of air through the socket member B when the pointed end 16 of the screw C is removed from the seat 11, there is a passage 19 extending longitudinally of the tube 10 throughout its length.

In use, when it is desired to apply the suction cup structure to a surface, the screw C is adjusted so that the pointed end 16 thereof seats firmly against the edges of and closes the opening 12 in the base 11 of the socket member B. The concave surface 20 of the body A is then pressed in the usual manner against the surface to be engaged. The knurled head 17 of the screw C may be used as a handle or finger piece for this purpose. When it is desired to remove the suction cup structure from such surface the screw C is adjusted to remove the pointed end 16 thereof from the opening 12 so that air from the atmosphere may enter the body A via the passage 19 and opening 12. When the vacuum between the body A and the engaged surface is thereby destroyed, the resiliency of the rubber body A and more particularly of the concave surface 20 thereof will cause detachment of the cup structure from the engaged surface without marring the same.

Should it be desired to use the cup structure to hold a paint mask such as a sheet D in place upon a suitable surface to be protected, then the body A of the cup structure would be upon the inner side of such mask, while the screw C would extend through an opening 21 in the mask so that the knurled head 17 is accessible upon the outside of the mask. To prevent the mask D from being torn by the screw C there is a grommet 22 in the opening 21 in the mask embracing the edges thereof and serving as an eyelet for the shank 15 of the screw. Such grommet 22 is on the shank 15 between the shoulder 18 thereof and the upper end of the tube 10. If desired such grommet 22 may be provided with an opening 23 for registration with the air passage 19 in the tube 10.

What I claim as my invention is:

1. A structure of the class described comprising a body having a suction face engageable with a surface to create a vacuum therebetween, and means for breaking the vacuum between said suction face and surface, including an interiorly threaded tube extending completely through said body from the exterior thereof to said suction face, an inner side wall of said tube being provided from one end to the other thereof with a longitudinally extending passage for air, the inner end of said tube having a closure substantially flush with the suction face of the body, said closure being provided in direct communication with the suction face of the body with an aperture through which air from the passage just mentioned may flow to said suction face, and an exteriorly threaded screw engaging the interiorly threaded tube without affecting the flow of air through said passage and having a pointed end engageable with the aperture aforesaid.

2. A structure of the class described comprising a body having a suction face engageable with a surface to create a vacuum therebetween, and means for breaking the vacuum between said suction face and surface, including a socket member extending upwardly through the body from its suction face to the exterior thereof, an inner side wall of the socket member being provided throughout its length with a longitudinally extending passage for air, the bottom of said socket member being substantially flush with the suction face and provided in direct communication with said suction face with an aperture through which air from the longitudinally extending passage may flow to said suction face, and a member adjustable in the socket member without affecting the flow of air through the passage aforesaid and having a portion controlling the flow of air through said aperture.

3. A structure of the class described comprising a body having a suction face engageable with a surface to create a vacuum therebetween, and means for breaking the vacuum between said suction face and surface, including a socket member extending through the body from its suction face to the exterior thereof and comprising an interiorly threaded tube provided at said suction face with an opening through which air from the tube may flow to said suction face, an inner side wall of said tube being provided throughout its length with a passage for conducting air from the exterior of the body to said opening, and means adjustable in said tube and engageable with said opening for controlling communication between said passage and suction face.

4. In a structure of the class described, an interiorly threaded tube open at one end and closed at the other, the closed end having a centrally disposed orifice for air, the interiorly threaded portion of the tube being provided from the open to the closed ends thereof upon the outer side of said threads with a longitudinally extending passage for conducting air from the open end of the tube to the orifice in the closed end thereof, and means controlling the orifice without affecting the flow of air through the passage including a manually operable element engaging the threads upon the interior of said tube and having a reduced end portion engageable with said orifice.

JAMES EDWARD DUGGAN.